(No Model.)

C. H. ROBERTS.
GROCER'S SCOOP.

No. 258,476. Patented May 23, 1882.

WITNESSES
F. L. Durand
H. B. Applewhaite

INVENTOR
Charles H. Roberts

By his Attorneys
A. H. Evans & Co.

N. PETERS. Photo-Lithographer, Washington, D. C.

United States Patent Office.

CHARLES H. ROBERTS, OF MONTOUR, IOWA, ASSIGNOR OF ONE-HALF TO O. H. MILLS.

GROCER'S SCOOP.

SPECIFICATION forming part of Letters Patent No. 258,476, dated May 23, 1882.

Application filed February 17, 1882. (No model.)

*To all whom it may concern:*

Be it known that I, CHARLES H. ROBERTS, of Montour, Iowa, have invented a new and useful Improvement in Grocers' Scoops, of which the following is a full, clear, and exact description, reference being had to the accompanying drawings, making a part of this specification, in which—

Figure 1:
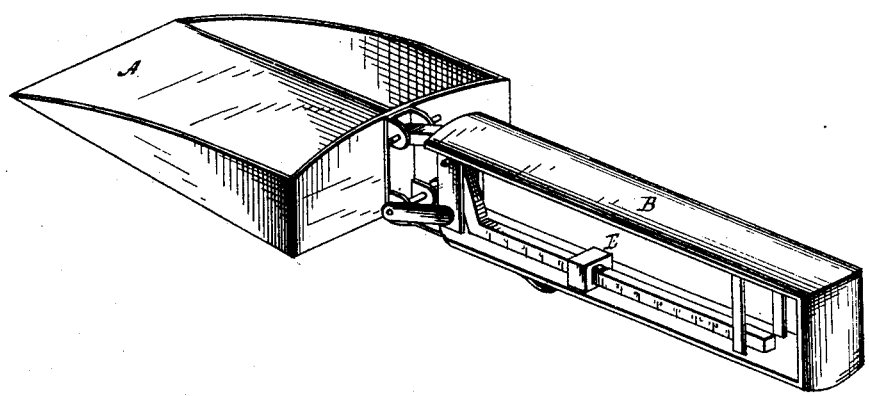
Figure 2:
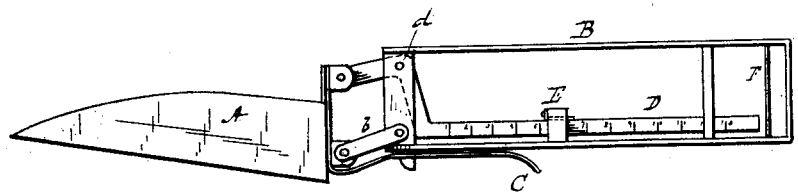

Figure 1 is a perspective view of a grocer's scoop with my improvements attached. Fig. 2 is a side elevation of the same.

The object of my invention is to furnish a combined scoop and scales whereby the article to be weighed can be readily weighed in the scoop itself and without the necessity of transferring it to other scales; and it consists in the combination of devices hereinafter described and claimed.

In the drawings, A represents a scoop, and B the handle, attached to the lower part of the head of the scoop by means of the pivoted arms $b$ $b$. The flat bar C is rigidly attached to the head of the scoop immediately below the pivoted arms $b$ $b$, and extends a few inches along the lower side of the handle, so as to be caught and firmly held by the forefinger while using the scoop for dipping up the material to be weighed. By the holding of the bar C firmly against the under side of the handle while using the scoop in dipping all strain is taken from the weighing devices, which I will now proceed to describe.

The scale-beam D forms a lever, with its fulcrum at $d$, and with its short arm loosely pivoted to the upper edge of the scoop-head, as shown in Fig. 2. The long arm of the beam is graduated and provided with a counterpoise, E. This counterpoise is slotted to receive the beam D, and in the slot may be a small spring bearing against the beam to hold it at any desired point while the scoop is used for dipping. For instance, if it be desired to dip up a pound of coffee the counterpoise is moved to the pound-notch, and there the spring holds it while the coffee is being dipped up and weighed. Behind the rear end of the long arm of the scale-beam is placed a spring, F, which prevents the counterpoise from dropping off the beam, and which, nevertheless, will allow the counterpoise to be changed when necessary.

Having thus described my invention, what I claim as new, and desire to secure by Letters Patent, is—

The scoop A, in combination with the pivoted handle B, the flat bar C, the link $b$, and the scale-beam D, provided with a counterpoise, E, constructed to operate substantially as and for the purpose set forth.

CHARLES H. ROBERTS.

Witnesses:
J. S. BROCK,
H. SOLEMAN.